US008029210B2

(12) United States Patent
McMillan et al.

(10) Patent No.: US 8,029,210 B2
(45) Date of Patent: Oct. 4, 2011

(54) METHODS AND APPARATUS FOR INSTALLATION OF VIV SUPPRESSION DURING INSTALLATION OF MARINE PIPELINE

(75) Inventors: David W. McMillan, Deer Park, TX (US); Donald W. Allen, Richmond, TX (US); Dean L. Henning, Needville, TX (US); Kenneth Loch, Houston, TX (US); Stephen P. Armstrong, Houston, TX (US); Li Lee, Houston, TX (US)

(73) Assignee: Shell Oil Company, Houston, TX (US)

( * ) Notice: Subject to any disclaimer, the term of this patent is extended or adjusted under 35 U.S.C. 154(b) by 1170 days.

(21) Appl. No.: 10/848,547

(22) Filed: May 17, 2004

(65) Prior Publication Data

US 2005/0254903 A1 Nov. 17, 2005

(51) Int. Cl.
*F15D 1/00* (2006.01)
*E02D 5/60* (2006.01)

(52) U.S. Cl. .................................................. 405/216
(58) Field of Classification Search .................. 405/211, 405/211.1, 212–216; 114/243; 166/350, 166/367
See application file for complete search history.

(56) References Cited

U.S. PATENT DOCUMENTS 4,398,487 A * 8/1983 Ortloff et al. ................. 114/243
5,460,463 A * 10/1995 Smith ........................... 405/212
6,067,922 A * 5/2000 Denison et al. ............... 114/243

* cited by examiner

*Primary Examiner* — Sunil Singh
(74) *Attorney, Agent, or Firm* — William E. Hickman (57) ABSTRACT

Methods and apparatus for the installation of VIV suppression during the S-Lay installation of a subsea pipeline. A locking member will be interposed between a pipe and a fairing rotatably mounted on the pipe, sufficient to bias the fairing against rotating. Upon marine application, the locking member will degrade, thereby releasing the fairing.

5 Claims, 7 Drawing Sheets

Fig. 1

Prior Art

METHODS AND APPARATUS FOR INSTALLATION OF VIV SUPPRESSION DURING INSTALLATION OF MARINE PIPELINE

BACKGROUND OF THE INVENTION

1. Field of the Invention

The present invention relates to apparatus, systems and methods for reducing vortex-induced-vibrations ("VIV"), current drag, low frequency drift oscillations due to random waves, and low frequency wind induced resonant oscillations. In another aspect, the present invention relates to apparatus, systems and methods comprising enhancement of VIV suppression devices for control of vortex-induced-vibrations, current drag, low frequency drift oscillations due to random waves, and low frequency wind induced resonant oscillations. In even another aspect, the present invention relates to apparatus, systems and methods comprising modified and improved performance fairings for reducing VIV, current drag, low frequency drift oscillations due to random waves, and low frequency wind-induced resonant oscillations. In still another aspect, the present invention relates to methods and apparatus for the "S-Lay" installation of pipe. In even still another aspect, the present invention relates to methods and apparatus installation of VIV suppression during the "S-Lay" installation of pipe.

2. Description of the Related Art

When a bluff body, such as a cylinder, in a fluid environment is subjected to a current in the fluid, it is possible for the body to experience vortex-induced vibrations (VIV). These vibrations are caused by oscillating hydrodynamic forces on the surface which can cause substantial vibrations of the structure, especially if the forcing frequency is at or near a structural natural frequency. The vibrations are largest in the direction transverse to flow, however, in-line vibrations can also cause stresses which are sometimes larger than those in the transverse direction.

Drilling for and/or producing hydrocarbons or the like from subterranean deposits which exist under a body of water exposes underwater drilling and production equipment to water currents and the possibility of VIV. Equipment exposed to VIV includes the smaller tubes and cables of a riser system, umbilical elements, mooring lines, anchoring tendons, marine risers, lateral pipelines, the larger underwater cylinders of the hull of a minispar or spar floating production system.

There are generally two kinds of water current induced stresses to which all the elements of a riser system are exposed. The first kind of stress as mentioned above is caused by vortex-induced alternating forces that vibrate the underwater structure in a direction perpendicular to the direction of the current. These are referred to as vortex-induced vibrations (VIV). When water flows past the structure, vortices are alternately shed from each side of the structure. This produces a fluctuating force on the structure transverse to the current. If the frequency of this harmonic load is near the resonant frequency of the structure, large vibrations transverse to the current can occur. These vibrations can, depending on the stiffness and the strength of the structure and any welds, lead to unacceptably short fatigue lives. Stresses caused by high current conditions have been known to cause structures such as risers to break apart and fall to the ocean floor.

The second type of stress is caused by drag forces which push the structure in the direction of the current due to the structure's resistance to fluid flow. The drag forces are amplified by vortex induced vibrations of the structure. For instance, a riser pipe which is vibrating due to vortex shedding will disrupt the flow of water around it more so than a stationary riser. This results in greater energy transfer from the current to the riser, and hence more drag.

Many methods have been developed to reduce vibrations of subsea structures. Some of these methods operate by modifying the boundary layer of the flow around the structure to prevent the correlation of vortex shedding along the length of the structure. Examples of such methods include the use of helical strakes around a structure, or axial rod shrouds and perforated shrouds. Other methods to reduce vibrations caused by vortex shedding from subsea structures operate by stabilization of the wake. These methods include use of fairings, wake splitters and flags.

VIV is also a common problem for subsea pipelines, especially the portions of the pipe line that span canyons or trenches on the ocean floor. These canyons or trenches can act as conduits and magnify the effects of currents at or near the ocean floor. As with vertical risers/tendons, the solution is to install VIV suppression such as fairings, wake splitters and flags.

Installation of VIV suppression after the laying of the pipe line very expensive, laborious, and dangerous. Ideally, VIV suppression would be installed on the pipe at the lay vessel as it is being laid.

There as two main methods of laying pipe, the "J-Lay" and "S-Lay."

With "J-Lay," a vertical lay vessel is utilized, in which pipe leaves the traveling vessel vertically, with the pipe essentially forming a "J" as it is being laid on the ocean floor. With J-Lay installation, VIV suppression is easily applied to the pipe at the vessel during installation.

With "S-Lay," pipe leaves the lay vessel in an essentially horizontal position, and rolled off of a radially shaped "stinger" mounted aft, with the pipe essentially forming an "S" as it is being laid on the ocean floor. The stinger cross-section is a "V" shaped trough conveyor comprising a series of rollers across which the pipe passes. As the stinger is "V" shaped, only a portion of the pipe engages rollers. The problem with installing VIV during an S-Lay, is that the stinger will tend to shear off anything that extends radially from the pipe at those places where it engages the pipe.

Thus, there is a need in the art for apparatus, systems and methods for suppressing VIV and reducing drag of a marine element.

There is another need in the art for apparatus, systems and methods for suppressing VIV and reducing drag of a subsea pipeline, which can be installed during the laying of the pipeline.

There is even another need in the art for apparatus, systems and methods for laying a subsea pipeline with VIV.

These and other needs of the present invention will become apparent to those of skill in the art upon review of this specification, including its drawings and claims.

SUMMARY OF THE INVENTION

It is an object of the present invention to provide for apparatus, systems and methods for suppressing VIV and reducing drag of a marine element.

It is another object of the present invention to provide for apparatus, systems and methods for suppressing VIV and reducing drag of a subsea pipeline, which can be installed during the laying of the pipeline.

It is even another object of the present invention to provide for laying a subsea pipeline with VIV.

These and other objects of the present invention will become apparent to those of skill in the art upon review of this specification, including its drawings and claims.

According to one embodiment of the present invention, there is provided a fairing for reducing vortex-induced-vibrations in a cylindrical marine element. The fairing includes a main body defining a circular passage for receiving the marine element, and comprising a tail section. A locking member is supported by the main body, wherein the member is positionable and lockable in the circular passage against any marine element in the passage to move the tail section away from any marine element in the passage, wherein at least a portion of the locking member comprises material that will degrade in a marine environment and upon degradation disengage from the marine element.

According to another embodiment of the present invention, there is provided a modified pipe, which includes a pipe section, a fairing having a tail section, and rotatably mounted on the pipe. Also included is a locking member interposed between the pipe section and the fairing, biasing the fairing against rotating, and positioning the tail section radially away from the pipe section, wherein at least a portion of the locking member comprises material that will degrade in a marine environment and upon degradation will no longer bias the fairing against rotating, and no longer position the tail section away from the pipe section.

According to even another embodiment of the present invention, there is provided a method of modifying a pipe having a fairing rotatably mounted thereon. The method includes positioning a locking member between the pipe and the fairing sufficient to bias the fairing against rotating, and position a portion of the fairing radially away from the pipe section, wherein at least a portion of the locking member comprises material that will degrade in a marine environment and upon degradation will no longer bias the fairing against rotating, and no longer position the fairing radially away from the pipe section. A further embodiment of this embodiment includes, placing the pipe, fairing and locking member in a marine environment, and allowing the locking member to degrade.

According to still another embodiment of present invention, there is provided a method of passing a pipe with a rotatably mounted fairing over a roller, wherein the fairing comprises a tail section. The method includes (A) positioning the fairing such that the tail section will not touch the roller as it passes over the roller. The method also includes (B) passing the pipe and fairing over the roller. A further embodiment of this embodiment includes, in step (A), further comprising positioning a locking member between the pipe and the fairing sufficient to bias the fairing against rotating, wherein at least a portion of the locking member comprises material that will degrade in a marine environment and upon degradation will no longer bias the fairing against rotating.

According to yet another embodiment of the present invention, there is provided a collar for securing a fairing rotatably mounted on a pipe. The collar includes a circular segment of less than 2Π radians, and a circular shaped band positioned around the segment.

Other embodiments include modifying a pipe by applying the collar to the pipe, passing a pipe with the collar over a roller by positioning the circular segment so that it clears the rollers.

Even other embodiments include modifying a pipe by applying both the collar and fairing of the present invention to the pipe, and passing a pipe with both the collar and fairing over a roller.

Still other embodiments include S-laying of pipe by utilizing the fairing and/or collar.

These and other embodiments of the present invention will become apparent to those of skill in the art upon review of this specification, including its drawings and claims.

DETAILED DESCRIPTION OF THE INVENTION

The present invention is best understood by first making reference to the prior art, and understanding the problem of installing VIV suppression during an S-Lay installation of pipe.

Figure 1:
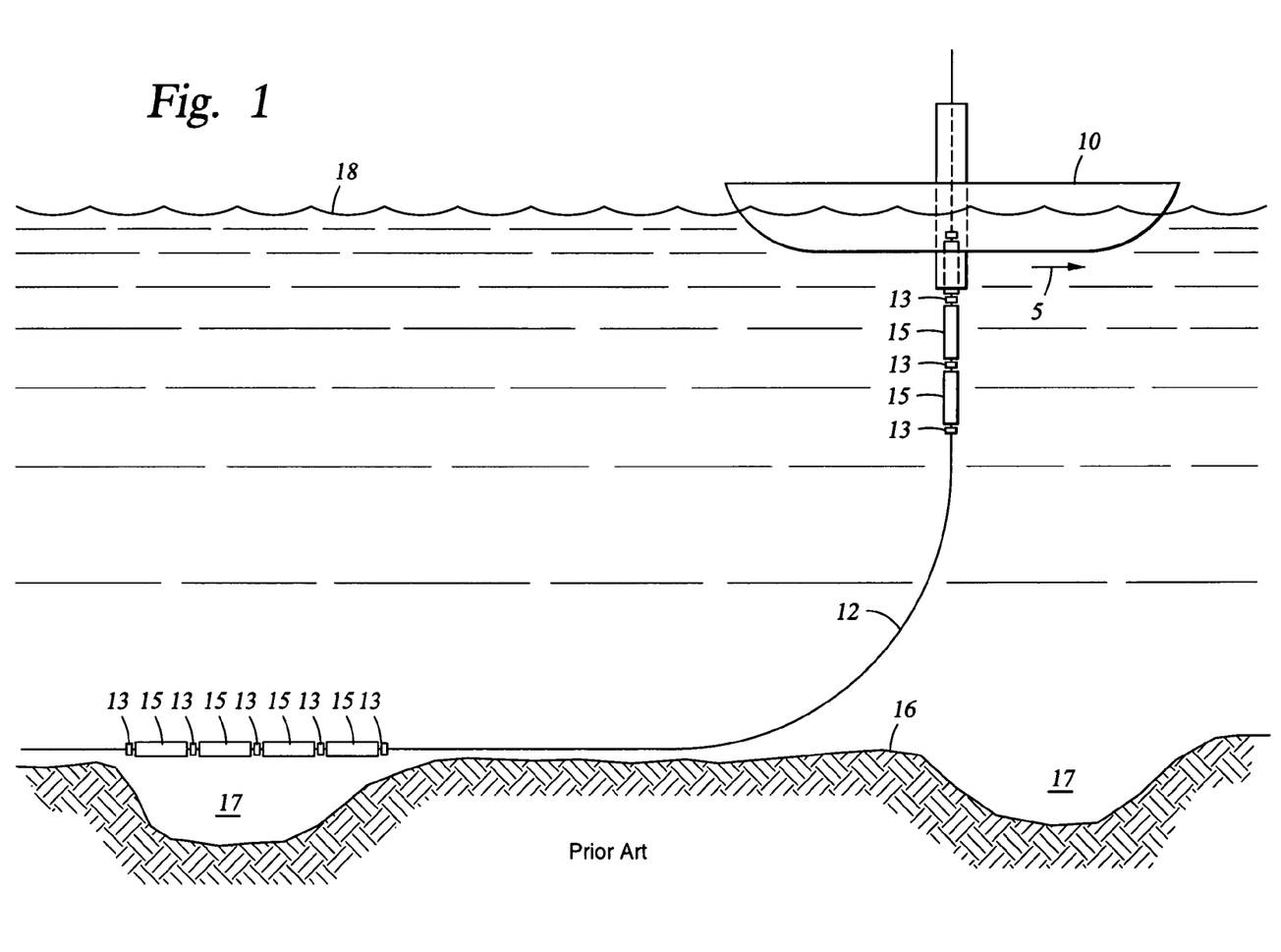
FIG. 1 is a schematic representation of a "J-Lay" installation of a subsea pipeline, showing vessel 10 moving in direction 5 at ocean surface 18, laying pipe 12 onto ocean floor 16.

Referring to FIG. 1, there is shown a schematic representation of a prior art "J-Lay" installation of a subsea pipeline, showing vessel 10 moving in direction 5 at ocean surface 18, laying pipe 12 onto ocean floor 16. The name "J-Lay" comes from the "J" shape made by pipe 12 during installation. As shown, VIV suppression is being installed at those locations where pipeline 12 will span channels/trenches 17. Fairings 15 and collars 13 are very easily added during installation.

Figure 2:
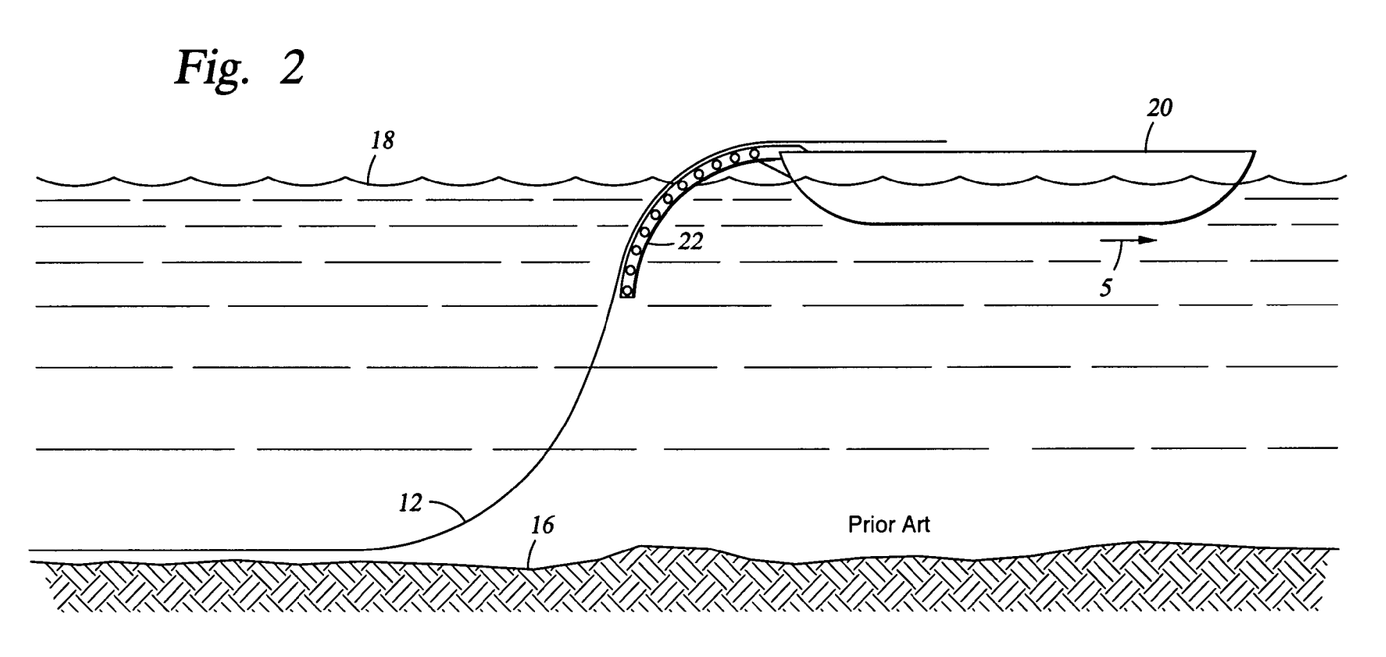
FIG. 2 is a schematic representation of an "S-Lay" installation of a subsea pipeline, showing vessel 20 moving in direction 5 at ocean surface 18, laying pipe 12 utilizing stinger 22 onto ocean floor 16.

Referring now to FIG. 2, there is shown a schematic representation of a prior art "S-Lay" installation of a subsea pipeline, showing vessel 20 moving in direction 5 at ocean surface 18, laying pipe 12 utilizing stinger 22 onto ocean floor 16. The name "S-Lay" comes from the "S" shape made by pipe 12 during installation.

Figure 3:
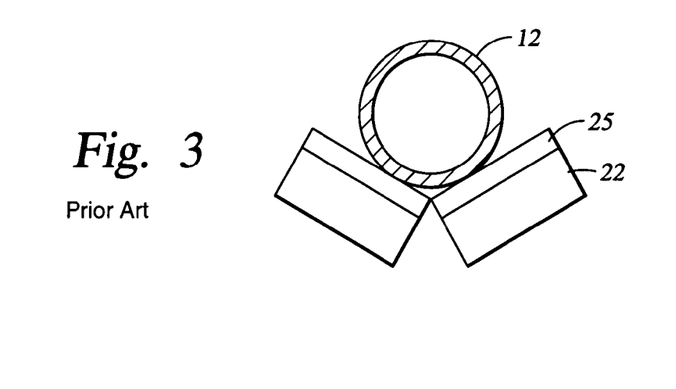
FIG. 3 is a cross-sectional representation of stinger 22 of FIG. 2, showing pipe 12 positioned and rolling across rollers 25.

Referring additionally to FIG. 3, there is shown a cross-sectional representation of stinger 22 of FIG. 2, showing pipe 12 without suppression positioned and rolling across rollers 25.

Figures 4, 5:
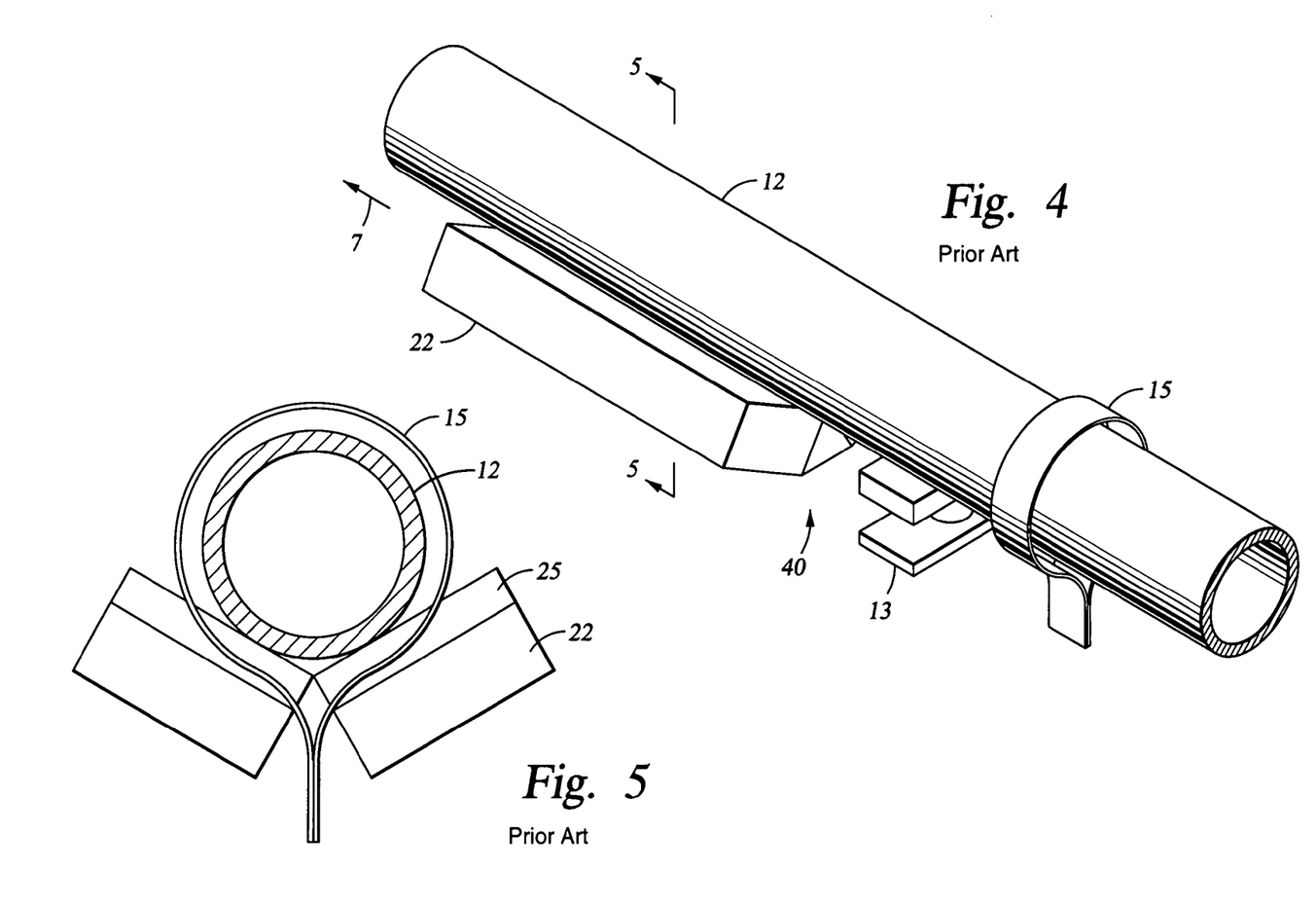
FIG. 4 is an isometric representation, showing pipe 12, having VIV fairing 15 and collar 13, positioned and rolling across stinger 22 in direction 7.
FIG. 5 is a cross-sectional representation of FIG. 4. taken at 5-5, showing pipe 12, having VIV fairing 15 and collar 13, positioned and rolling across stinger 22.

Referring additionally to FIGS. 4 and 5, there are shown, respectively, an isometric representation and a cross-sectional representation, of pipe 12, having VIV fairing 15 and collar 13, with pipe 12 positioned and rolling across stinger 22 in direction 7.

The problem with the prior art is best understood as follows. As pipe 12 rolls across stinger 22 in direction 7, any attached suppression, i.e., collar 13 and fairing 15, will encounter stinger 22 at point 40, resulting in such collar 13 and fairing 15 either being broken or sheared off of pipe 12, or held back at point 40 while pipe 12 passes through the collars and fairings.

According to the present invention, if the tail end of the fairing could be oriented to avoid stinger 22, then it could pass over stinger 22 intact.

Figure 6:
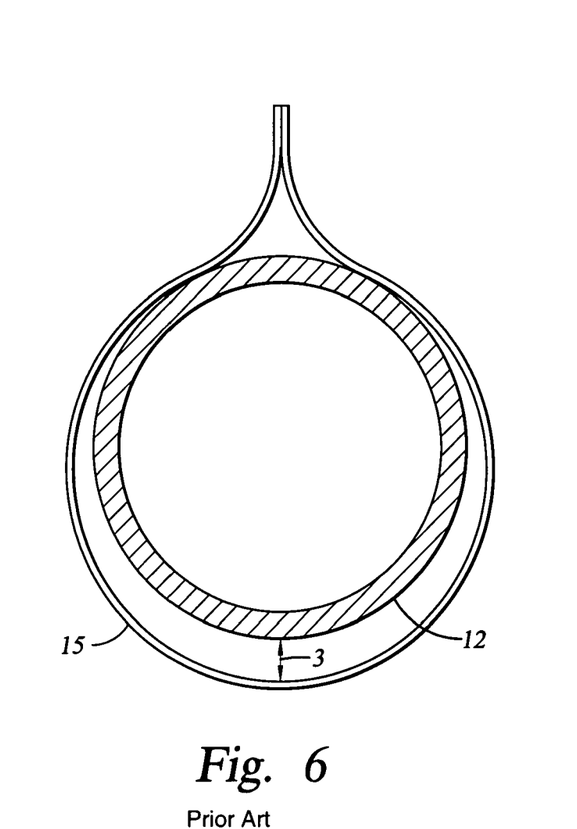
FIG. 6 is a cross-sectional representation showing fairing 15 mounted on pipe 12, showing gap 3 formed as a result of gravity.

However, in addition to the fairing tail engaging the stinger, gravity will tend to pull the fairing away from the pipe allowing that portion of the fairing to fall below the pipe and also engage the stinger. This problem can be seen by reference to FIG. 6, which is a cross-sectional representation showing fairing 15 mounted on pipe 12, showing gap 3 formed as a result of gravity. Obviously, as this fairing 15 approaches the stinger, the portion of the fairing sagging below the pipe will engage the stinger, and the fairing will either be sheared/knocked off, or held back while the pipe passes through.

Thus, the present invention additionally provides that if the portion of the fairing that sags below the pipe and engages the stinger could be abutted firmly against the pipe, that portion of the fairing could pass easily over the stinger.

Figure 7:
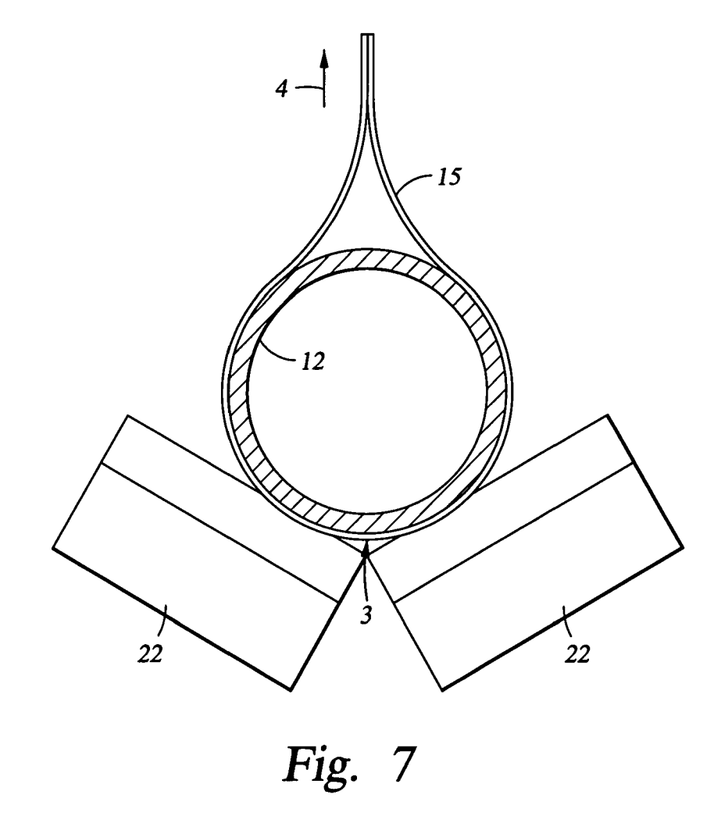
FIG. 7 is a cross-sectional representation showing fairing 15 mounted on pipe 12, showing a substantially smaller gap 3 that can be achieved by lifting fairing 15 in direction 4.

Referring now to FIG. 7, there is shown a fairing with its tail oriented to avoid the stinger, and that has been abutted firmly against the pipe. FIG. 7 is a cross-sectional representation showing fairing 15 mounted on pipe 12, showing fairing tail 15 oriented to avoid stinger 22, and showing that a substantially smaller gap 3 that can be achieved by lifting fairing 15 in direction 7.

Of course, once fairing 15 has been lifted in direction 7 is must be held in place so that it can pass safely over stinger 22. The present invention utilizes a positioning lock 30 to keep fairing 15 abutted in place. It should be understood that any suitable positioning lock 30 may be utilized.

Figure 9:
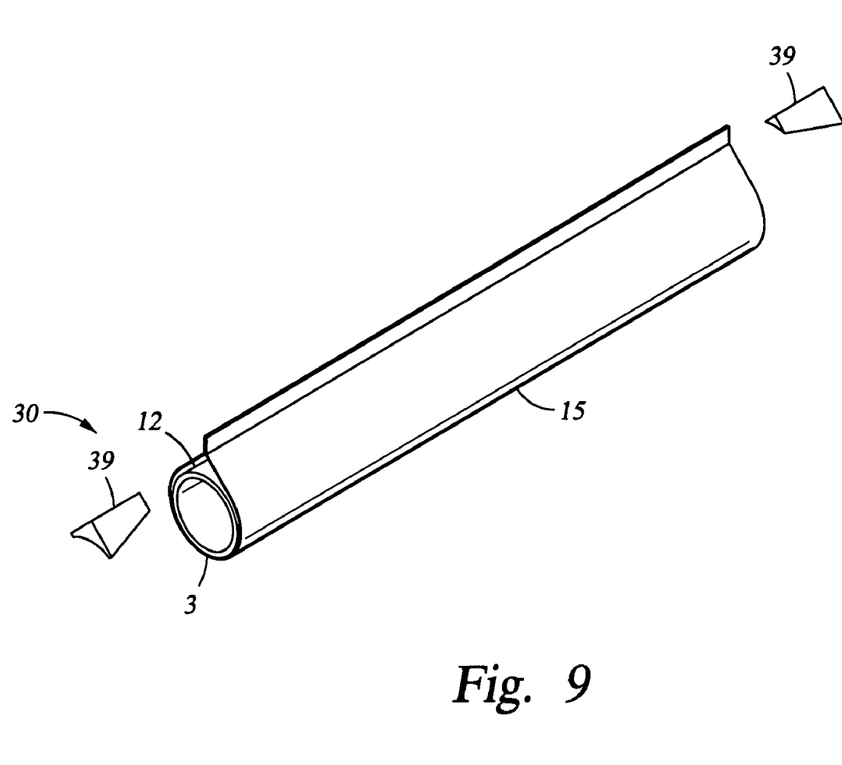

One non-limiting embodiment of positioning lock 30 can be seen by reference to FIG. 9, in which a wedge 39 has been inserted into the upper gap between fairing 15 and pipe 12 to minimize gap 30 and abut fairing 15 against pipe 12. It is envisioned that any suitable number of wedges may be utilized, and that such wedges may comprise any suitable shape.

Figure 8:
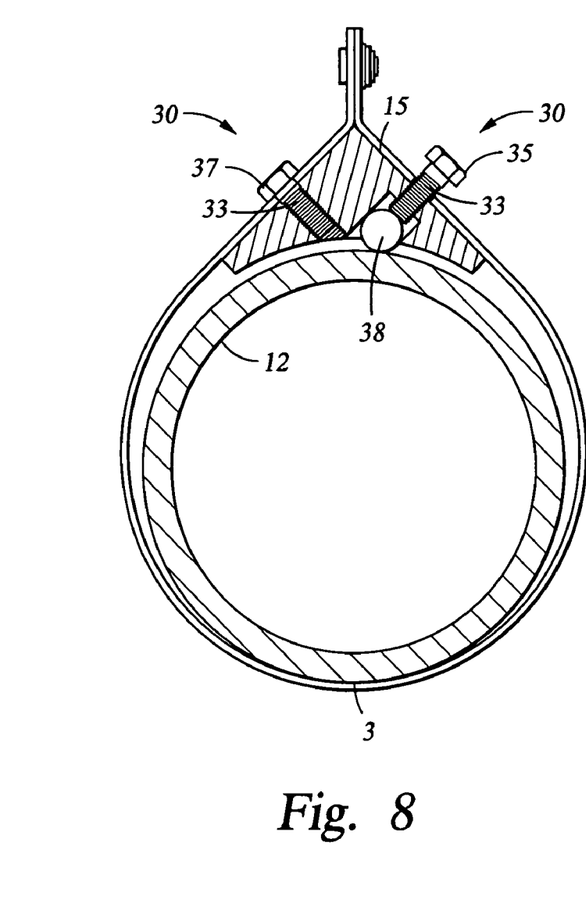
FIGS. 8 and 9 are a cross-sectional representations showing fairing 15 mounted on pipe 12, showing fairing 15 lifted and held in place by positioning lock 30.

Another positioning lock embodiment utilizes a set screw/bolt, with two non-limiting embodiments shown in FIG. 8. Referring now to FIG. 8 there is shown a cross-sectional representations showing fairing 15 mounted on pipe 12, showing fairing 15 lifted and held in place by positioning lock 30. Threaded passages 33 are provided in fairing 15 for receiving set screws/bolts 35 and 37. As shown, set screw/bolt 37 engages pipe 12 directly, whereas, set screw/bolt 35 engages a pipe contact member 38, which in turn engages pipe 12.

Once fairing 15 passes over stinger 22, fairing 15 must now be made to freely rotate around pipe 12. Of course, positioning lock 30 prevents such free rotation. According to another embodiment of the present invention, position lock 30 will comprises materials which will degrade in the aquatic environment and allow free rotation of fairing 15 around pipe 12. The materials are selected to degrade in the aquatic environment at a rate slow enough to allow for installation, but fast enough so that the fairing will properly operate not too long after installation. The materials must have physical properties suitable to allow fairing 15 to be locked into place, and to withstand the rigors in pipe installation, and travel across the stinger.

Not all of positioning lock 30 need be comprised of degradable materials. As one non-limiting example, pipe contact member 38 comprises a degradable material. As another non-limiting example, set screw/bolt 37 comprises a degradable material. It should be easy to see, that even bolt 37 does not have to be made entirely of degradable materials. As non-limiting examples, only the tip of set screw 37 in contact with pipe 12 need comprises degradable material, or perhaps the threads of screw/bolt 37 will degrade. Alternatively, the threads of threaded passages 33 can be made to degrade, freeing set screw 38. As even another non-limiting example, a positioning lock 30 with a degradable locking pin can be easily envisioned.

Materials that will degrade in marine environments and that will have adequate physical properties are well known to those of the materials art. Preferably, such materials will be degradable thermoplastics and theermosets, most preferably biodegradable thermoplastics and thermosets.

Figure 10:
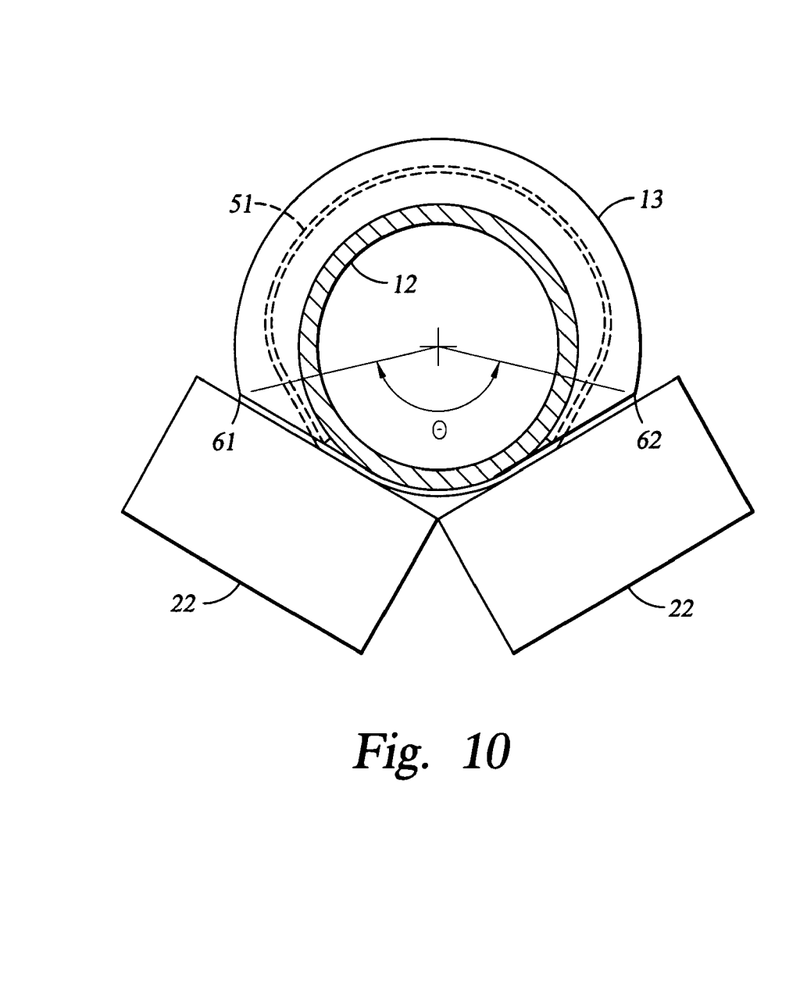
FIGS. 10 and 11 are cross-sectional representations of stinger 22, showing collar 13 mounted on pipe 12.
Figure 11:
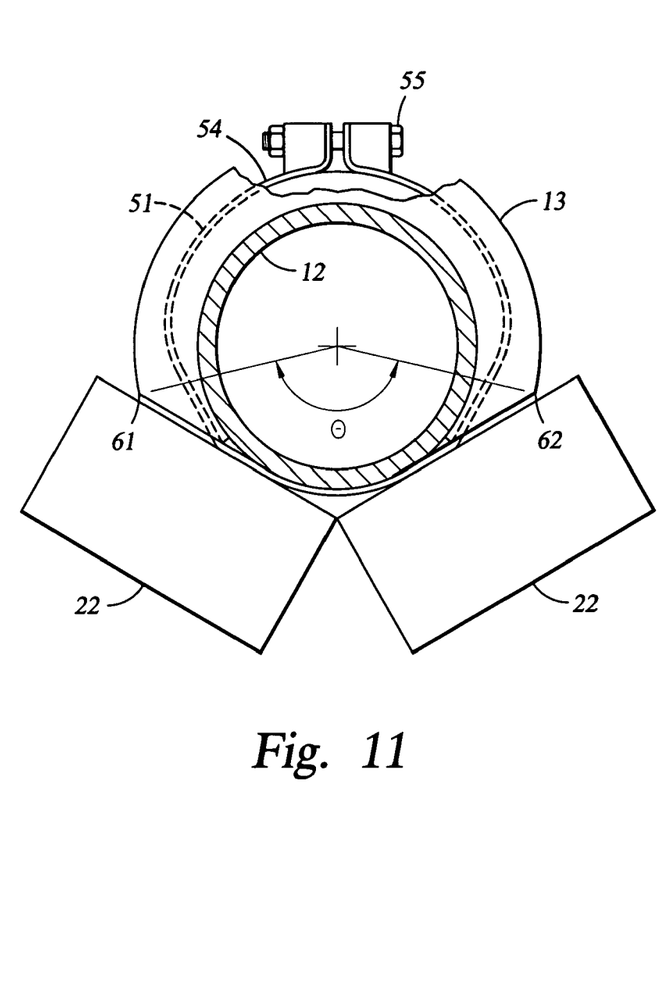
Figure 13:
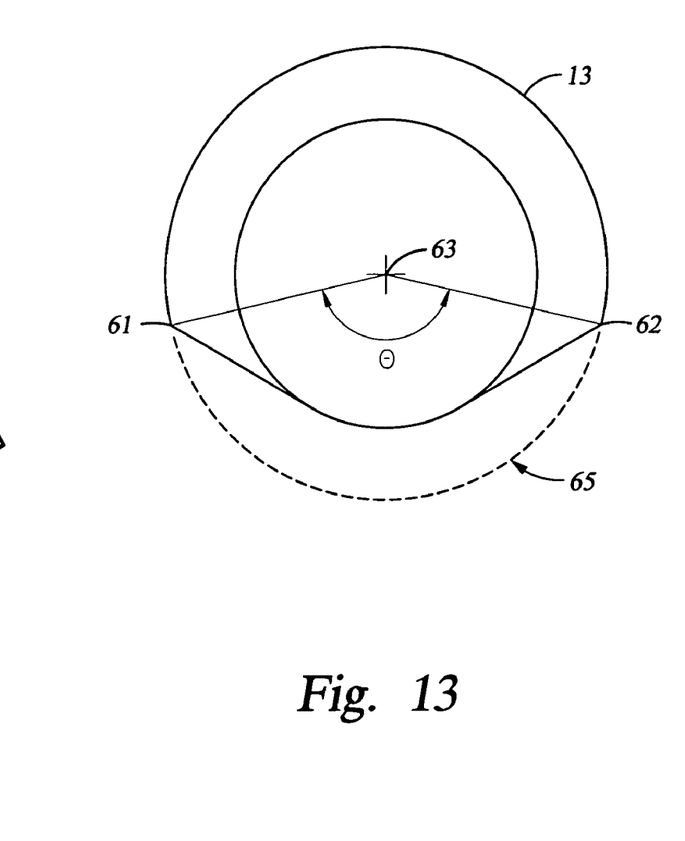
FIG. 13 is an isolated representation of collar 13.

The present invention utilizes unique collars 13 to secure fairings 15 to pipe 12. Specifically, the collars of the present invention are designed to avoid colliding with stinger 22. Referring now to FIGS. 10 and 11, there are shown cross-sectional representations of stinger 22, showing two embodiments of collar 13 mounted on pipe 12. More clearer details are provided by additional reference to FIG. 13, which is an isolated representation of collar 13. Point 63 is the center of pipe 12 cross-section and of collar 13 cross-section. Assuming a uniform circular collar 13, the interfering radial portion 65 of collar 13 is that portion which would engage stinger 22, and is that portion 65 of collar 13 between points 61 and 62, defining angle Θ. Within this Θ radius, collar 13 must be made thin enough to pass over stinger 22, and in a preferred embodiment is merely a thin band 51. Interfering portion 65 of collar 13 that does not engage stinger 22 defines an angle 2Π-Θ radians. Thus, in the present invention, for a stinger having an interference angle with a collar of Θ radians, the main body of collar of the present invention is less than or equal to 2Π-Θ radians, with at least a Θ radian portion of the collar comprising a thin section having a thickness that will not interfere with passage over the stinger. The main body of collar 13 must extend radially away from pipe 12 sufficient to secure fairing 15 in place. It is preferred that collar 13 be provided with a band groove 54 for receiving band 51. In some embodiments, a band locking/tightening mechanism, such as locking bolt/nut 55 are provided.

Figure 12:
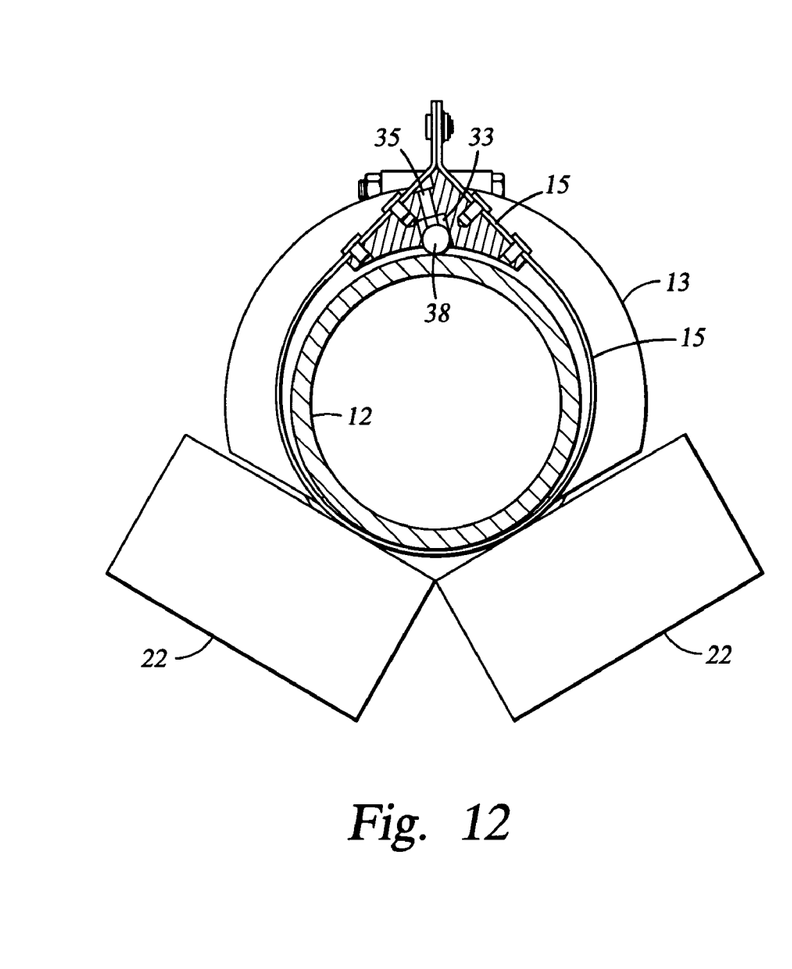
FIG. 12 is a cross-sectional representation of stinger 22, showing fairing 15 mounted on pipe 12.

Referring now to FIG. 12, there is shown a cross-sectional representation of stinger 22, showing fairing 15 mounted on pipe 12.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

We claim:

1. A fairing for reducing vortex-induced-vibrations in a cylindrical marine element, comprising, a main body defining a circular passage for receiving the marine element, and comprising a tail section; and a locking member supported by the main body, wherein the member is positionable and lockable in the circular passage against any marine element in the passage to move the tail section away from any marine element in the passage and biasing the fairing and preventing rotation thereof, wherein at least a portion of the locking member comprises material that will degrade in a marine environment and upon degradation disengage from the marine element.

2. A modified pipe comprising:

a pipe section;

a fairing having a tail section, and rotatably mounted on the pipe; and a locking member interposed between the pipe section and the fairing, biasing the fairing and preventing rotation thereof, and positioning the tail section radially away from the pipe section, wherein at least a portion of the locking member comprises material that will degrade in a marine environment and upon degradation will no longer bias the fairing and prevent rotation thereof, and no longer position the tail section away from the pipe section.

3. The modified pipe of claim 2, further comprising a collar for securing the fairing rotatably mounted on the pipe, the collar comprising:

a circular segment of less than $2\pi$ radians; and a circular shaped band positioned around the segment.

4. A method of modifying a pipe having a fairing rotatably mounted thereon, the method comprising:

positioning a locking member between the pipe and the fairing sufficient to bias the fairing and prevent rotation thereof, and position a portion of the fairing radially away from the pipe section, wherein at least a portion of the locking member comprises material that will degrade in a marine environment and upon degradation will no longer bias the fairing and prevent rotation thereof, and no longer position the fairing radially away from the pipe section.

5. The method of claim 4, further comprising:

placing the pipe, fairing and locking member in a marine environment; and allowing the locking member to degrade.

\* \* \* \* \*